Figure 1:
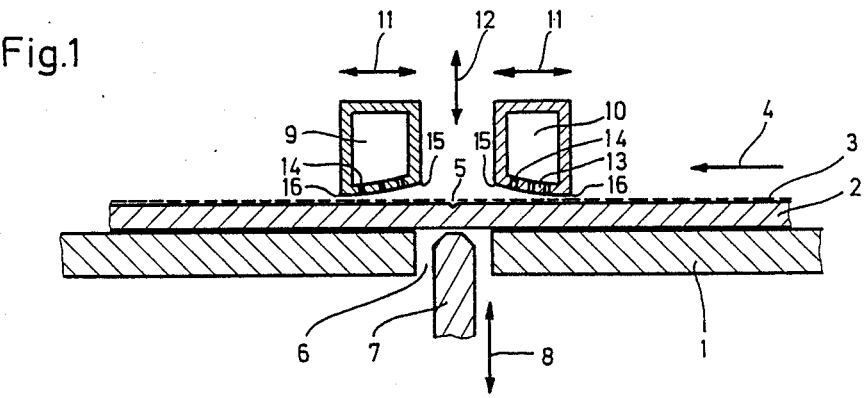

United States Patent [19]

Lisec

[11] Patent Number: 4,948,025
[45] Date of Patent: Aug. 14, 1990

[54] APPARATUS FOR BREAKING GLASS SHEETS SCORED ON ONE SIDE

[76] Inventor: Peter Lisec, Bahnhofstrasse 34, A-3363 Amstetten-Hausmening, Austria

[21] Appl. No.: 283,556

[22] Filed: Dec. 12, 1988

[30] Foreign Application Priority Data

Apr. 25, 1988 [AT] Austria .................. 1051/88

[51] Int. Cl.⁵ .......................................... C03B 33/033
[52] U.S. Cl. ...................................... 225/104; 225/93
[58] Field of Search ................ 225/93, 96.5, 103, 104, 225/105

[56] References Cited

U.S. PATENT DOCUMENTS

| | | | |
|---|---|---|---|
| 3,253,756 | 5/1966 | Haley et al. | 225/2 |
| 3,372,847 | 3/1968 | Walters et al. | 225/96.5 |
| 3,570,734 | 3/1971 | Allen | 225/96.5 X |
| 3,668,955 | 6/1972 | Rupprecht et al. | 225/96.5 X |
| 3,693,852 | 9/1972 | Simomura | 225/96.5 X |

FOREIGN PATENT DOCUMENTS 3428863 2/1986 Fed. Rep. of Germany .

*Primary Examiner*—Hien H. Phan
*Attorney, Agent, or Firm*—Young & Thompson

[57] ABSTRACT

In an apparatus for the breaking of glass sheets (2) scored on one side, especially provided with a metallic coating on one side, a breaking bar (7) or a rotationally driven breaking roller (28) that can be lifted from below against the glass sheet (2) are provided, and two abutments (9 and 10) acting from above against the glass sheet (2) are likewise included. The abutments (9 and 10) are not in physical contact with the topside of the glass sheet (2) but rather hold down the latter by an air cushion produced between these abutments and the topside of the glass sheet (2), this air cushion being formed by compressed air exiting from nozzles (14). In this way, friction movements that could damage the coating (3) of the glass sheet (2) during the breaking step are precluded.

8 Claims, 1 Drawing Sheet

APPARATUS FOR BREAKING GLASS SHEETS SCORED ON ONE SIDE

The invention relates to an apparatus for breaking glass sheets scored on one side, with a supporting surface designed as a table, for example, for the scored glass sheets, with a pair of abutments acting from above against the glass sheet, these abutments being oriented essentially in parallel to each other, and with a lifting bar or an optionally rotationally driven lifting roller that can be brought into contact with the glass sheet from below between the abutments.

Such devices, which are also called breaking tables, are provided following glass cutting tables in order to snap off the glass sheets, scored on one side in glass cutting tables, along the scored lines to the desired stock sizes. The breaking step on the breaking tables takes place by lifting a bar or roller from below out of the supporting surface while two abutments, disposed on both sides of the bar or roller, are in contact with the glass sheet from above. During the snap-off step, a relative motion arises between the topside of the glass sheet and the abutments urging the sheet downwardly; such motion can mar the surface of the glass sheets and, in particular, can destroy any coatings that may have been provided at that location. The danger of marring of glass panes and/or of damaging coatings on the glass sheets is increased due to the fact that, during the snap-off step, extremely fine glass slivers are produced which, when passing in between the abutments and the glass sheets, lead during the snap-off step to scratches in the glass sheet.

The invention is based on the object of providing an apparatus of the type mentioned in the foregoing making it possible to break, in particular, glass sheets unilaterally provided with a coating, without danger of damage to the glass sheets and especially to the coating.

This has been achieved in accordance with the invention by providing at the abutments air outlet ports oriented toward the glass sheet, and that the air outlet ports are connected to a source of pressurized gaseous medium, especially air.

In the breaking table according to this invention, the abutments are not in contact with the topside of the glass sheet to be snapped off but rather depress this glass sheet by means of an air cushion formed between the abutments and the glass sheet. In this way, destructive relative motions between the abutments and the glass sheets are precluded on the surface of glass sheets and/or on any coatings that may have been provided.

A further advantage of the apparatus of this invention resides in that the abutments, in contrast to abutments that are in contact with the glass sheet, need not be precisely adjusted to the thickness of the glass sheet to be snapped off. This is so because the holddown force exerted on the glass sheet by way of the air cushions under the abutments according to this invention is higher in case of thicker glass sheets (smaller distance) and lower in case of thinner glass sheets (larger distance). Consequently, without adjustment of the abutments in the vertical direction, the lower holddown force required for breaking thinner glass sheets is automatically provided. This holddown force increases in case of thicker glass sheets without adjustment of the abutments so that then the greater holddown force is produced as needed for breaking thicker glass sheets. Thus, it is possible, for example, to snap off glass sheets having a thickness of between 2 and 10 mm without vertical readjustment of the abutments.

In a practical embodiment of the apparatus of this invention, the provision is made that the abutments are designed to be hollow and exhibit air outlet ports on their side facing the glass sheet, and that the abutments are connected to at least one source for pressurized gaseous medium, particularly air.

The openings in the abutments can be fashioned as round nozzles or as slotted nozzles. In either case, several rows of nozzles can be arranged, extending in the longitudinal direction of the abutments. In this way, an especially vigorous air cushion is formed between the abutments and the glass sheet.

In order to prevent the glass sheet, even in case of abutments located closely above the glass sheet, from coming into contact with the mutually facing bottom edges of the abutments during the breaking step under the effect of the lifting bar or roller, an embodiment is preferred wherein the underside of the abutments facing the supporting surface and, respectively, the glass sheet is designed to be oblique, the bottom edges of the abutments proximate to the lifting bar or roller being located at a higher level than the other bottom edges thereof. In this connection, it is preferred to design the underside of the abutments facing the supporting surface or the glass sheet to have a convex curvature transversely to the longitudinal extension thereof.

Figure 2:
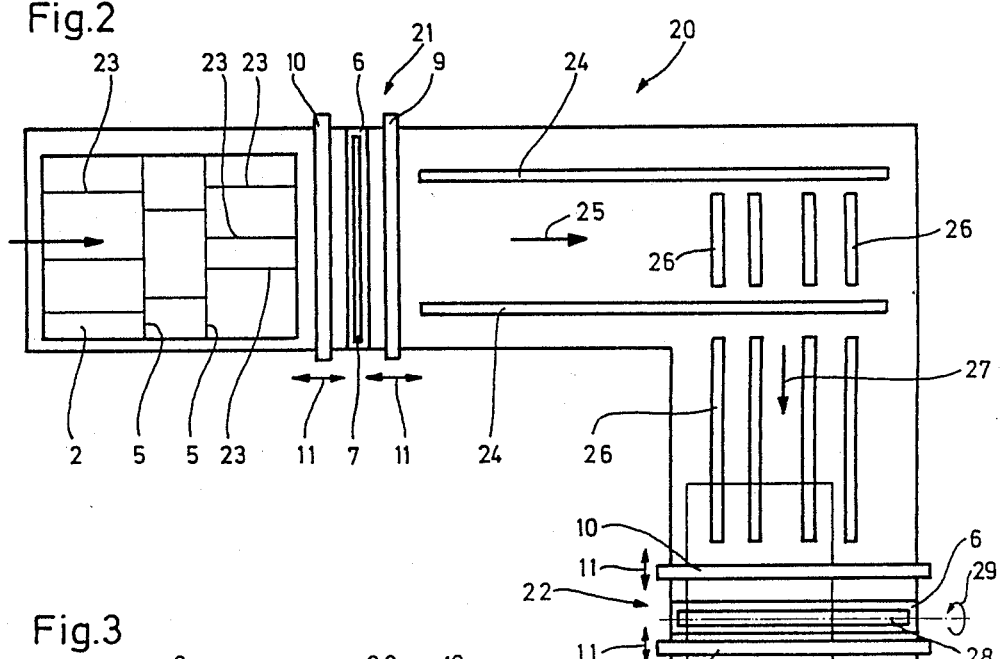

Additional details and features of the invention can be seen from the following description of embodiments, reference being had to the accompanying drawing wherein:

FIG. 1 shows in a sectional view an apparatus for breaking glass sheets scored on one side and FIG. 2 shows a breaking table, arranged subsequently to a glass cutting table, not illustrated, with a station for the static breaking of glass sheets and a station for the dynamic breaking of glass sheets.

An apparatus for breaking glass sheets scored on one side, illustrated merely in its essential parts, comprises a supporting surface 1 designed as a table, for example. A glass sheet 2, carrying on its topside a coating, e.g. a metallic layer 3 applied by vaporization, is fed on the supporting surface 1 in the direction of arrow 4. The glass sheet 2 is moved in the direction of arrow 4 until a score 5 provided on its topside is located exactly above a lifting bar 7 arranged in a slot 6 of the supporting surface 1. The lifting bar 7 can be lifted and lowered in the direction of double arrow 8.

Above the supporting surface 1, abutments 9 and 10 are disposed on both sides of the lifting bar 7; the mutual spacing of the abutments is variable in the direction of the double arrows 11, the abutments 9 and 10 remaining in symmetrical alignment with respect to the lifting bar 7 even when their mutual distance is varied.

For possible adaptation to varying thicknesses of the glass sheets 2 and optionally also for enhancing the snap-off step, the abutments 9 and 10 can be lifted and lowered with respect to the supporting surface 1 in the direction of double arrow 12.

As illustrated in FIG. 1, the abutments 9 and 10 are fashioned to be hollow and exhibit several air outlet ports 14 on their side (wall 13) facing the glass sheet 2.

The air outlet ports 14 are fashioned as round nozzles in the illustrated example, three rows of round nozzles 14 having been provided, extending in the longitudinal direction of the abutments 9 and 10, respectively.

Conduits for supplying pressurized gas, particularly air, are connected to the ends of the abutments 9 and 10, the supplied compressed air then exiting from the abutments 9 and 10 via the nozzles 14 so that the glass sheet 2 is urged against the supporting surface 1. Upon lifting of the lifting bar 7 (optionally in combination with a lowering of the abutments 9 and 10), the glass sheet 2 is snapped off along the score line 5 without the abutments 9 and 10 coming into physical contact with the glass sheet 2 and, respectively, the coating 3 applied thereto.

As shown in FIG. 1, the wall 13 of the abutments 9 and 10 is designed so that it extends obliquely to the supporting surface 1, the edge 15 proximate to the abutment 10 having a greater distance from the supporting surface 1 than the other edge 16 of the abutments 9 and 10. Additionally, the underside of the wall 13 is fashioned to be convex in the longitudinal direction of the abutments 9 and 10.

The abutments 9 and 10 exhibit, for example, a width of 10 cm and a length of up to 3 m, depending on the size of the glass cutting table.

FIG. 2 illustrates a breaking table 20 wherein a snap-off station 21 for static breaking and a snap-off station 22 for dynamic breaking of glass sheets 2 with scores 5 are provided. The snap-off station 21 for the static breaking step is designed as illustrated in FIG. 1. The glass panels produced by breaking along the scores 5, which still exhibit scores 23, are conveyed by means of conveyor belts 24 lowerable into the supporting surface 1 in the direction of arrow 25 and subsequently by means of conveyor belts 26 in the direction of arrow 27 to the dynamic snap-off station 22. The dynamic breaking station 22 corresponds to the static breaking station having the structure shown in FIG. 1, except that in place of the breaking bar 7 a liftable breaking roller 28 is included which is rotationally driven in the direction of arrows 29. In the dynamic breaking station 22, the glass panels coming from the static breaking station 21 can be snapped off along the scores 23 in a continuous procedure.

It is to be noted basically that static breaking of glass sheets 2 provided with scores 5 is suitable primarily for thicker panes and smaller mutual spacings of the scores 5 whereas dynamic breaking is predominantly suited for transverse snap-off (compare FIG. 2 and associated description); preferably, thinner glass panes, or glass panes exhibiting larger mutual spacings of scores, are broken in a dynamic breaking step. The breaking roller 28 serves not only for bending the glass sheets for purposes of breaking them, in cooperation with the abutments 9 and 10, but also for transporting the glass sheets 2 through the dynamic breaking station 22.

Figure 3:
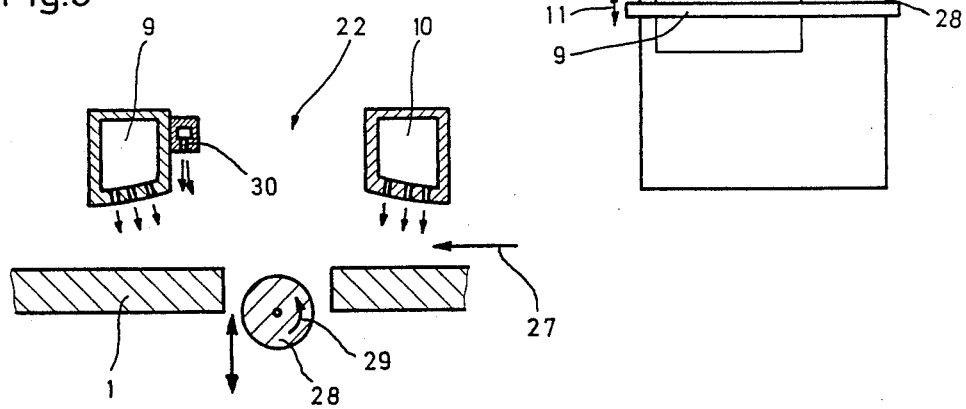

On the side of the abutment 9 of breaking station 22, facing the abutment, additional nozzles 30 can be arranged (FIG. 3) from which a gas, especially air, exits in the downward direction. This feature prevents the forward edge of the glass sheet from lifting off too much from the supporting surface 1 and perhaps striking the abutment 9. The nozzles 30 are preferably located at a level higher than the nozzles 14 of the abutment 9.

It is furthermore to be noted that the breaking table illustrated in FIG. 2 need not necessarily be angled; it can also be straight.

I claim:

1. Apparatus for breaking glass sheets scored on one side, comprising means defining a horizontal supporting surface, elongated means movable vertically relative to said supporting surface to contact and press upwardly on a said glass sheet from below on the side of said glass sheet opposite a score line which is parallel to and directly over said elongated means, and a pair of elongated abutments disposed above said glass sheet on opposite horizontal sides of said elongated means and parallel to said elongated means and to each other, said abutments being hollow and being adapted to be connected to a source of pressurized gaseous medium, said abutments having air outlet ports oriented toward said glass sheet, the under sides of the abutments facing the glass sheet being oblique and each having a bottom edge nearest said elongated means which is at a higher level than a bottom edge farthest from said elongated means.

2. Apparatus according to claim 1, said air outlet ports being circular in cross section.

3. Apparatus according to claim 1, said air outlet ports being disposed in several parallel rows.

4. Apparatus according to claim 1, said under sides of said abutments being convex in a cross sectional plane perpendicular to the length of said elongated abutments.

5. Apparatus according to claim 1, wherein said elongated means is a lifting bar.

6. Apparatus according to claim 1, wherein said elongated means is a rotatable roller.

7. Apparatus according to claim 1, and nozzles with nozzle orifices directed toward said glass sheet and mounted on said abutment which is downstream with respect to a direction of movement of said glass sheet beneath said abutments, said nozzles being disposed at a higher elevation than said under side of the abutment on which said nozzles are mounted.

8. Apparatus for breaking glass sheets scored on one side, comprising means defining a horizontal supporting surface, elongated means movable vertically relative to said supporting surface to contact and press upwardly on a said glass sheet from below on the side of said glass sheet opposite a score line which is parallel to and directly over said elongated means, and a pair of elongated abutments disposed above said glass sheet on opposite horizontal sides of said elongated means and parallel to said elongated means and to each other, said abutments being hollow and being adapted to be connected to a source of pressurized gaseous medium, said abutments having air outlet ports oriented toward said glass sheet, the mutual spacing of said abutments being variable symmetrically to said elongated means.

* * * * *